United States Patent [19]

Branson

[11] Patent Number: 4,787,755
[45] Date of Patent: Nov. 29, 1988

[54] RECLOSABLE FLEXIBLE CONTAINER HAVING FASTENER PROFILES SEALED AT THEIR ENDS TO THE OUTSIDE OF THE BAG

[75] Inventor: Mark Branson, Shelbyville, Ind.
[73] Assignee: KCL Corporation, Shelbyville, Ind.
[21] Appl. No.: 84,334
[22] Filed: Aug. 11, 1987

Related U.S. Application Data

[63] Continuation of Ser. No. 796,632, Nov. 8, 1985, abandoned.

[51] Int. Cl.$^4$ ............................................. B65D 33/24
[52] U.S. Cl. ...................................... 383/65; 24/462; 156/66; 383/68
[58] Field of Search ............ 383/63, 65, 109, 93, 383/95, 68, 69; 156/66; 428/139, 140; 24/460, 462, 576, 587

[56] References Cited

U.S. PATENT DOCUMENTS

| Re. 28,969 | 9/1976  | Naito ........................... 383/65   |
| 2,514,750  | 7/1950  | Dobbs et al. .................. 383/64    |
| 2,772,712  | 12/1956 | Post ............................. 383/65  |
| 2,978,769  | 4/1961  | Harrah ......................... 383/65 X |
| 3,164,186  | 1/1965  | Weber et al. ................. 383/63 X  |
| 3,346,883  | 10/1967 | Erseh ........................... 383/63 X |
| 3,425,469  | 2/1969  | Ausnit ......................... 383/65   |
| 4,358,966  | 11/1982 | Stevenson ................. 383/109 X    |
| 4,691,373  | 9/1987  | Ausnit ......................... 383/63   |
| 4,703,518  | 10/1987 | Ausnit ......................... 383/63   |

FOREIGN PATENT DOCUMENTS

| 0090167 | 3/1961  | Denmark ....................... 383/63 |
| 0098822 | 10/1961 | Norway ......................... 383/63 |

Primary Examiner—Stephen Marcus
Assistant Examiner—Bryon Gehman
Attorney, Agent, or Firm—Robert S. Beiser

[57] ABSTRACT

A reclosable pouch is provided having front and back walls and an opening along its upper edge. A first fastener profile is sealed on its ends to the exterior of the front wall of the pouch. The fastener profile extends longitudinally near the pouch opening. A second fastener profile is sealed on its ends to the exterior of the back wall of the pouch. The first and second fastener profiles each have a rib member extending longitudinally thereon and a groove for reception of the oppositely disposed rib. The fastener profiles are adapted for interlocking with the front and back walls of the pouch being interposed therebetween. A method and apparatus for manufacturing the aforesaid pouches are also described herein.

12 Claims, 3 Drawing Sheets

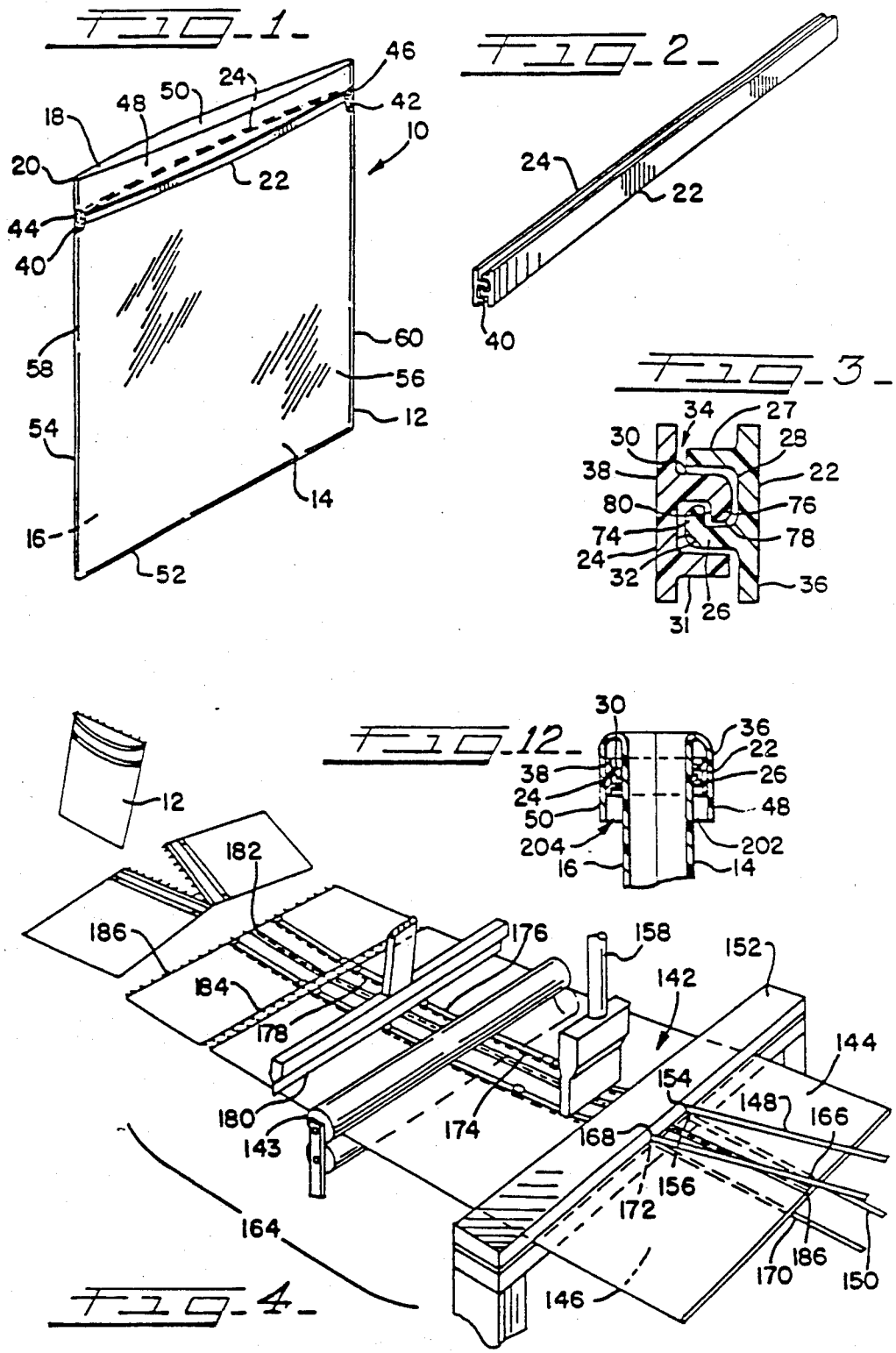

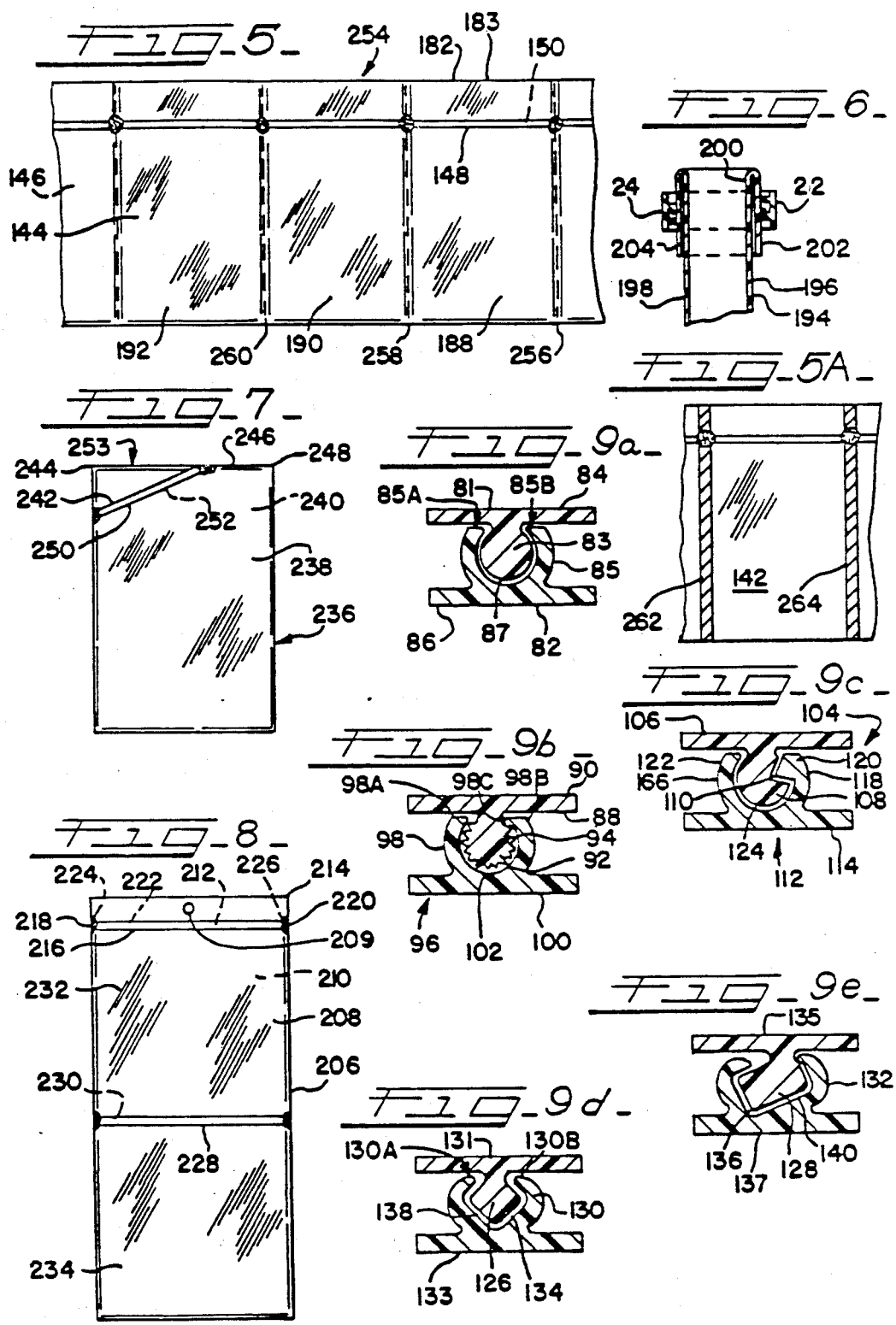

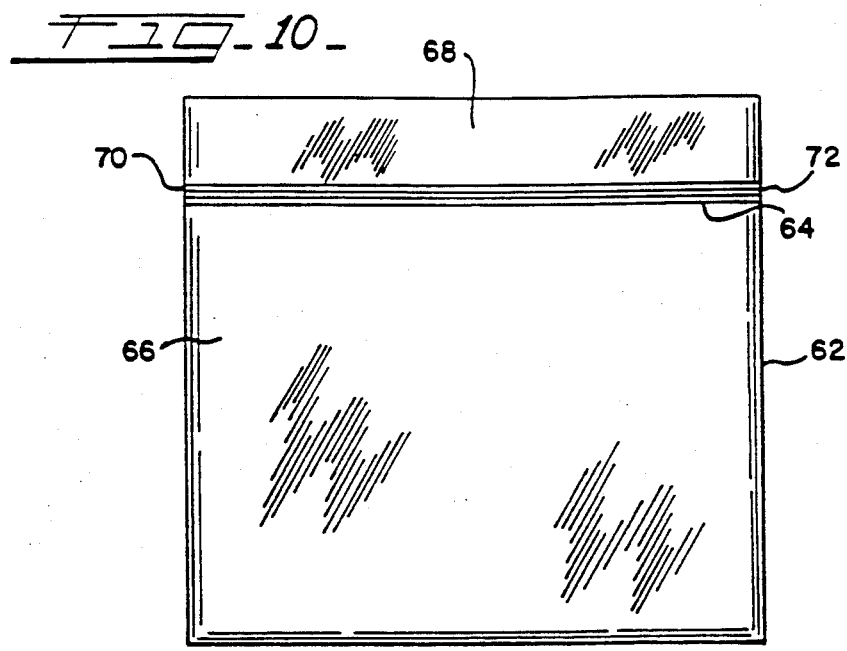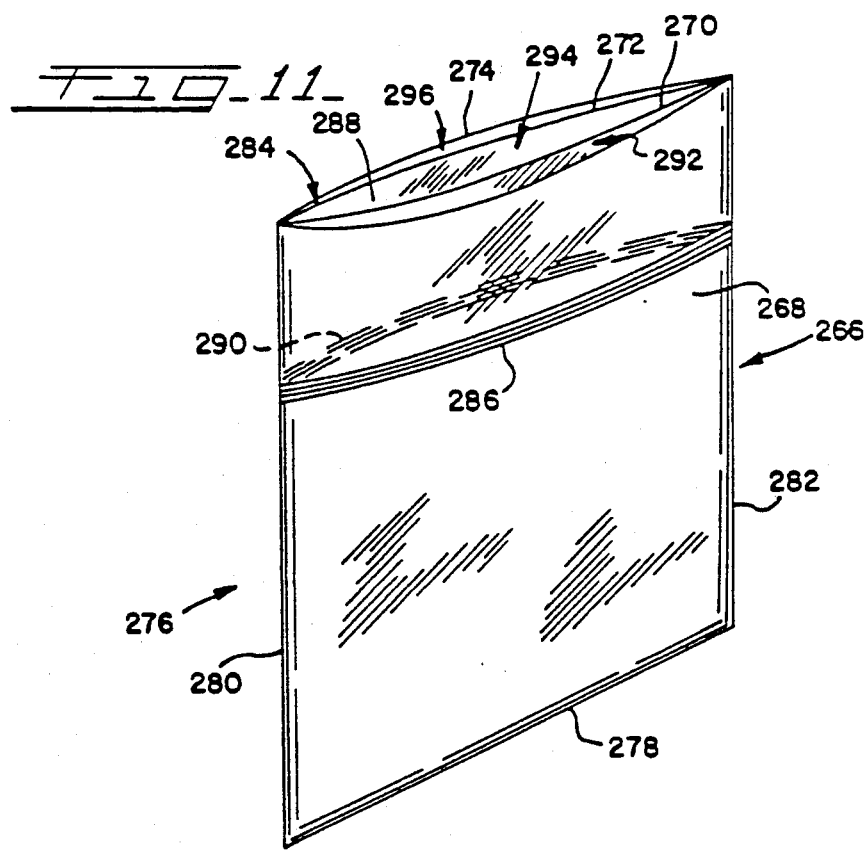

RECLOSABLE FLEXIBLE CONTAINER HAVING FASTENER PROFILES SEALED AT THEIR ENDS TO THE OUTSIDE OF THE BAG

This is a continuation, of application Ser. No. 796,632, filed Nov. 8, 1985, now abandoned.

BACKGROUND OF THE INVENTION

The present invention relates generally to reclosable flexible plastic containers and in particular to reclosable flexible containers having fastener profiles affixed to the exterior of the container.

In the manufacture of reclosable plastic bags, the bags are usually formed with a folded bottom edge and with side edges sealed to each other. Flexible reclosable plastic fastener strips are usually sealed inside the top edges of the bag. Alternatively, fastener profiles may be integrally formed in the plastic film, as seen in U.S. Reissue Pat. No. 28,959; Naito. The fastener strips may take forms such as shown in U.S. Pat. No. 2,780,261, Svec et al and U.S. Pat. No. 4,430,070; Ausnit, as well as various other configurations.

In the manufacture of bags such as illustrated in Svec et al., the bag bodies are formed of a thin lightweight plastic film which is extruded separately from the fastener. The fastener strips are extruded with a process that provides interlocking rib and groove elements carefully shaped and sized so that they will interlock when pressed together and will separate when pulled apart by opening flanges. These strips have webbed portions which are sealed to the film of the bag. The bags in question can be manufactured in a multiple operation so that two bag bodies, in one embodiment, project from the center of a single web of plastic material. By cross-cutting and slitting along the length of the material, two bags are formed simultaneously. Since the overall cost of completed bags are a function of the speed at which they can be manufactured, this method reduces costs. However, problems have appeared in the past in the sealing of the fastener strips to the film. The amount of heat used in joining the fasteners to the bag wall has an effect on the seal. If insufficient heat is applied, the seal will be inadequately formed so that the bag will leak, or the fastener web will peel away from the film to which it is attached. If too much heat is applied, the plastic will melt away so that there may be holes in the wall of the bag. It is also important for the fastener strips and the bag film to be accurately orientated with respect to each other. These requirements have resulted in reducing the speed of manufacture and increasing the cost.

Accordingly, it is the object of the present invention to provide a method of manufacturing reclosable plastic containers without the need for a continuous accurate seal of the fastener profiles to the inner surface of the containers.

It is an additional object of the invention to provide a reclosable plastic container which facilitates the precise orientation of the fastener profiles during manufacture.

It is an additional object of the present invention to provide a method of manufacturing reclosable plastic containers which is low in cost, high speed, and which reduces the quantity of containers rejected.

Others objects, advantages and features and equivalent structures within the scope of the invention will become apparent to those skilled in the art in connection with the teachings of the principles thereof in the specification, claims and drawings.

SUMMARY OF THE INVENTION

The present invention concerns a reclosable flexible container, a method and apparatus for manufacturing such a container and fastener profiles used thereon.

The container of the present invention is a pouch having front and back walls and an opening at the top end. A first fastener profile is affixed to the exterior of the front wall, parallel to the pouch opening the pouch opening. A second fastener profile is affixed to the exterior of the back wall proximate the pouch opening and is longitudinally aligned with the first fastener profile. The first and second fastener profiles are constructed for selected interlocking with the front and back walls of the pouch being interposed between. In other words, the fastener profiles lock together through the walls of the pouch.

Since the fastener profiles must face inwardly, it is difficult to continuously seal the profiles to the exterior walls of the pouch. This problem is solved in one embodiment of the present invention by sealing only the ends of the fastener profiles to the edges of the pouch and allowing the remainder of the fastener profiles to be moveable so as to be more easily aligned and to interlock through the walls of the pouch.

In order to prevent the pouches from inadvertently opening, the fastener profiles are designed so that one side of the first fastener profile is more easily opened than the opposite side. Preferably, the edge of the first fastener profile which is more easily opened faces the top of the pouch. As a result, it is more difficult to open the pouch from the inside than from the outside, thereby preventing inadvertent opening.

The invention also includes a method of manufacturing such flexible reclosable containers. The method includes the steps of advancing a double web of plastic material having a first layer and second layer. A first fastener profile is advanced into proximity with the top of the first layer of plastic film. A second fastener profile is advanced into proximity with the bottom of the second layer of plastic film. The first and second fastener profiles are then aligned with the first and second layers of plastic material, and guided into contact therewith. The fastener profiles are then intermittently sealed to the first and second layers of the plastic film and to themselves. The plastic film is then intermittently sealed into bag shape containers, which may be cut into separate containers, or remain connected in a continuous strip by means of perforations.

Other objects and advantages will become apparent upon reading the following description while referring to the attached drawings.

BRIEF DESCRIPTION OF THE DRAWINGS

FIG. 1 of the drawings is a front perspective view of a flexible reclosable plastic container.

FIG. 2 of the drawings is a front perspective view of a pair of interlocked fastener strips, as used on the flexible reclosable container of FIG. 1.

FIG. 3 of the drawings is a vertical section of the fastener strips of FIG. 2.

FIG. 4 of the drawings is a front perspective view of an apparatus for manufacturing the flexible reclosable container of FIG. 1 of the drawings.

FIG. 5 of the drawings is a front view of a strip of flexible reclosable containers connected in a single web by a series of perforations.

FIG. 5a of the drawings is a front view of a web of flexible reclosable container having diagonal perforations between each undivided container.

FIG. 6 of the drawings is a vertical section of the top portion of a flexible reclosable plastic container having two plies of plastic film about its top opening, with first and second fastener profiles affixed to the outside surfaces of the opening.

FIG. 7 of the drawings is a front view of a flexible reclosable container having an angled pour spout formed by a pair of fastener members diagonally disposed on the exterior surfaces of one corner of the container.

FIG. 8 of the drawings is a front view of a flexible reclosable container having a pair of compartments formed therein by a series of fastener strips.

FIG. 9a of the drawings is a vertical section of one embodiment of a fastener strip for use in the flexible reclosable container of FIG. 1 of the drawings.

FIG. 9b of the drawings is a vertical section of an alternate embodiment of a fastener strip for use in the flexible reclosable container of FIG. 1 of the drawings.

FIG. 9c of the drawings is a vertical section of an alternate embodiment of a flexible fastener strip for use in the flexible reclosable container of FIG. 1 of the drawings.

FIG. 9d of the drawings is a vertical section of an alternate embodiment of a pair of fastener strips used in the flexible reclosable container of FIG. 1 of the drawings.

FIG. 9e of the drawings is a vertical section of an alternate embodiment of a pair of fastener strips for use in the flexible reclosable container of FIG. 1 of the drawings.

FIG. 10 of the drawings is a front view of a sheet of plastic film having a fastener profile affixed thereon proximate its edges.

FIG. 11 of the drawings is a front perspective view of a flexible reclosable plastic container, divided into compartments by layers of plastic film and sealed at the top by a pair of reclosable fastener strips.

FIG. 12 of the drawings is a vertical section of the top portion of a flexible reclosable plastic container having rolled lip of plastic film about its top opening, with first and second fastener profiles affixed to the inside surfaces of the rolled lip on opposite sides of the container.

DETAILED DESCRIPTION OF THE PREFERRED EMBODIMENT

While the present invention is susceptible of embodiment in many different forms, there is shown in the drawings and will herein be described in detail several specific embodiments with the understanding that the embodiments illustrated are only exemplifications and illustrations of the invention and the invention is not limited thereto except insofar as those who have the disclosure before them will be able to make modifications and variations therein without departing from the scope of the invention.

Turning to FIG. 1 of the drawings, a reclosable flexible container 10 is shown. Container 10 is formed as a pouch 12 having a front wall 14 and a back wall 16. A pouch opening 18 at the upper edge 20 of pouch 12 provides an opening into the container itself. A first fastener profile 22 is affixed to the exterior of front wall 14 and extends longitudinally thereon proximate pouch opening 18. A second fastener profile 24 is affixed to the exterior of back wall 16. First fastener profile 22 and second fastener profile 24 are constructed and arranged, as seen in FIG. 2, for selective interlocking. As best seen in FIG. 3, first fastener profile has interlocking rib 26, guide 27 and groove 28 disposed therebetween. Second fastener profile 24 has a rib 30 and guide 31 projecting therefrom with groove 32 formed therebetween. Rib 26 is adapted for engagement with rib 30 and groove 32. Similarly, rib 30 is adapted for engagement with rib 26 and groove 28. As may be further seen in FIG. 3, the gap 34 extending between rib 26, rib 30, groove 28 and groove 32 is sufficiently large to accommodate one or more layers of plastic film when first fastener profile 22 is engaged with second fastener profile 24. As a result, first fastener profile 22 may be interengaged with second fastener profile 24 through first layer 14 and second layer 16 of pouch 12. Alternate fastener profiles commonly known in the art, such as those seen in U.S. Pat. No. 3,338,284, Ausnit, may also be utilized.

It is commonly known in the art to seal reclosable fasteners such as fastener profile 22 to a sheet of plastic film using conventional heat sealing equipment. However, fastener strips are customarily sealed on their base, such as base 36 of first fastener profile 22 or base 38 of second fastener profile 24. If base 36 were sealed to the exterior of front wall 14, rib 26 would project outwardly from front wall 14, and thus would not be in position for engagement with second fastener profile 24. Alternatively, while it is possible to continuously seal fastener strips 22 and 24 to front wall 14 and rear wall 16 with rib 26 facing rib 30 through pouch 12, it becomes more difficult to obtain a good seal between fasteners 22 and 24 when they are engaged. In the present invention, in a preferred embodiment, best seen in FIG. 1, first fastener profile 22 is sealed to front wall 14 at its ends 40 and 42 with rib 26 facing rib 30. Similarly, second fastener profile 24 is sealed to rear wall 16 at ends 44 and 46. At the same time, end 40 is sealed to end 44 and end 42 is sealed to end 46, due to the melting of the thin plastic material. First fastener profile 22 and second fastener profile 24 are precisely aligned prior to sealing. Fastener profiles 22 and 24 are interlockable by pressing the aforesaid rib and groove elements together. Conversely, the flexible fasteners may be manually separated by drawing apart rib element 26 from groove 32 and similarly drawing apart rib element 30 from groove 28.

In an alternative embodiment of the invention, best seen in FIG. 12 of the drawings, fastener profiles 22 and 24 are sealed respectively to front wall 14 and rear wall 16 with rib 26 laterally disposed from rib 30. Such sealing may be accomplished in this case by sealing base 36 of first fastener profile 22 and base 38 of second fastener profile 24 to front wall 14 and rear wall 16 respectively. Flanges 48 and 50 of pouch 12 are then rolled over to form a lip such as lips 202 and 204 seen in FIG. 6 of the drawings. Ribs 26 and 30 then face each other with front wall 14 and rear wall 16 being interposed therebetween. Fastener strips 22 and 24 may then be interlocked as described above. Thus an alternative method of manufacture is presented.

In alternate embodiments of the invention, it may be desirable to attach a fastener profile of a first material to a flexible film of a second material. For example, polypropylene is a desirable film material in that it has great clarity. Polyethylene may be a desirable fastener material because of its high flexibility. However, generally speaking, materials of a different chemical nature cannot be bonded to each other by the use of heat. This difficulty may be solved by forming perforations in front wall 14 and rear wall 16 in the area where the ends 40 and 42, 44 and 46 of fastener profiles 22 and 24 meet. When fastener profiles 22 and 24 are heat sealed, the thermoplastic material melts so as to pass through the perforations so as to form a seal between the fastener strips and the film. Alternatively, when laminated films are used, an underlying laminate layer may be constructed of the same thermoplastic material as the fastener strips. Again, perforations may be formed in the area proximate the ends 40, 42, 44 and 46 of fastener strips 22 and 24 so that when the fastener strips are heat sealed to the film, the thermoplastic material flows through the perforations joining the fastener strips to the underlying laminate of plastic material. Such perforation may be formed utilizing a laser or a conventional perforating wheel.

One of the principal advantages of the aforesaid use of fastener profiles sealed on their ends to the edges of pouch 12 is that a single seal through the material may be effected sealing both fastener profile 22 and fastener profile 24. Precise control of the heat temperature is not required since the underlying material can be melted. As a result, an extremely thin film, on the order of 0.25 mils in thickness can be utilized for the manufacture of such a pouch. One preferred material for construction of such pouches is linear low density polyethylene. The use of such thin film also facilitates interlocking of fastener profiles 22 and 24 with front wall 14 and rear wall 16 interposed therebetween. However, fastener profiles 22 and 24 may be designed so that space 34 (FIG. 3) is large enough to accommodate thicker films, preferably up to about 8 mils in thickness.

It should be further noted that interlocking profiles 22 and 24 are affixed to bag 12 substantially in parallel to opening 18, which extends along the top 20 of bag 12. In the embodiment shown, profiles 22 and 24 are affixed a distance below opening 18 so as to provide flanges 48 and 50 for gripping by the user when opening bag 12. Flanges 48 and 50 in reality are the top portion of front wall 14 and rear wall 16. In the embodiment shown, front wall 14 and rear wall 16 are a single piece of plastic film which is folded at bottom edge 52 of bag 12. Side edges 54 and 56 of bag 12 are formed by sealing together front wall 14 and rear wall 16 along seal lines 58 and 60.

In an alternate embodiment of the invention, best seen in FIG. 10 of the drawings, a sheet 62 of thermoplastic material has a flexible closure 64 attached thereon. Sheet 62 can be generally described as having a webbed portion 66 and a marginal portion 68. Fastener profile 64 is intermittently sealed to sheet 62 proximate marginal portion 68. In a preferred embodiment such intermittent sealing comprises sealing of fastener profile 64 at its ends 70 and 72 to sheet 62. Sheet 62 with fastener profile 64 affixed thereon is adapted for sealing to a second sheet, not shown, but similarly constructed and having a similar fastener profile attached thereon. The two sheets may be sealed together so as to form a pouch. The specific configuration of fastener profile 64 is substantially identical to profile 22, seen in FIG. 3 of the drawings, and the resulting pouch is substantially identical to pouch 12.

Returning to FIG. 3 of the drawings, as mentioned previously, fastener profile 22 is formed as a strip having a substantially flat base 36. Rib member 26 extends substantially perpendicularly from base 36, and longitudinally along the length of fastener strip 22. A guide member 27 extends from base 36 in longitudinal alignment with rib member 26 so as to form a groove 28 therebetween. Rib member 26 has a lip 74 extending toward guide member 27. Fastener strip 24 also has a substantially flat base 38 formed as a strip. Rib member 30 extends substantially perpendicularly from base 38 and longitudinally along the length of fastener strip 24. Guide member 31 extends from the base 38 in longitudinal alignment with rib member 30 so as to form a groove 32 therebetween. Rib member 30 has a lip 76 at its distal end which curves toward guide member 31. As mentioned previously, fastener strips 22 and 24 are constructed of a resilient plastic material. As a result, when fastener strip 22 is pressed into mating engagement with fastener strip 24, rib member 26 and rib member 30 deflect from their perpendicular position sufficiently for lips 74 and 76 to pass each other and interlock. Specifically, ledge 78 on lip 74 interlocks against ledge 80 on lip 76. In addition, rib member 26 becomes positioned within groove 32. Similarly, rib member 30 becomes positioned within groove 28. Nevertheless, space is still provided in gap 34 for accommodating one or more plies of plastic film.

It should be noted that while the fastener shown in FIG. 3 has a single rib and groove on each fastener strip, a plurality of such ribs and grooves may be utilized as seen in U.S. Pat. No. 4,430,070. It should also be noted that while fastener profiles in the past have utilized rib and groove configurations, none has provided a space for positioning one or more plies of plastic material when interlocked with a second fastener profile.

In an alternate embodiment not directly shown in the drawings, the fastener profile may comprise a single male member projecting from a fastener strip and adapted for engagement with an oppositely disposed fastener profile having a female member adapted for receiving and engaging the male profile. Example of such profiles may be seen in the aforesaid U.S. Pat. No. 3,338,284 or U.S. Pat. No. 3,198,228, copies of which are attached hereto and incorporated herein.

Turning now to FIG. 9a of the drawings, flexible reclosable plastic fastener profiles 81 and 82 are disclosed. Fastener profile 81 has a substantially cylindrical member 83, (shown in cross section), tangentially attached thereon with a substantially flat base 84 affixed thereto. Fastener profile 82 has a substantially C-shaped member 85 tangentially attached to a flat base 85. C-shaped member 85 is sized and shaped for reception of, and engagement with cylindrical member 83. There is a sufficient gap 87 between profiles 81 and 82 when engaged to allow several layers of plastic film to be interposed therein. As a result, profiles 81 and 82 may be engaged through the walls 14 and 16 of pouch 12 such as that shown in FIG. 1. As further seen in FIG. 9a C-shaped member 85 has a first lip 85a and a second lip 85b. Second lip 85b is thicker than first lip 85a and is positioned toward the inside of pouch 12. As a result of this greater thickness, pouch 12 is easier to open from the outside than from the inside, which helps prevent inadvertent opening.

Turning now to FIG. 9b of the drawings, in an alternate embodiment, a fastener profile 88 is provided having a flat base 90 and a substantially cylindrical member 92 tangentially affixed thereon. Cylindrical member 92 has a series of ribs 94 extending coaxially about its periphery. Fastener profile 96 has a C-shaped member 98 tangentially attached to a flat base 100. C-shaped member 98 is adapted for engagement with cylindrical member 92. The gap 102 formed therebetween is sized for reception of one or more layers of plastic film. C-shaped member 98 has a first lip 98a and a second lip 98b. Second lip 98b is thicker than first lip 98a and is positioned toward the inside of pouch 12 when fastener profile 96 is sealed thereon. As a result, pouch 12 is easier to open from the outside than from the inside. In addition, second lip 98b has a hook 98c extending from the distal end thereof which also helps to prevent inadvertent opening of pouch 12.

Turning now to FIG. 9c of the drawings, a flexible reclosable fastener profile 104 is shown having a flat base 106 and a cylindrical member 108 tangentially affixed thereon and extending longitudinally thereon. Cylindrical member 108 has an indentation 110 therein. Fastener profile 112 has a flat base 114 having a substantially C-shaped 116 member affixed tangentially thereon. C-shaped member 116 has a lip 118 which is sized for mating engagement with indentation 110. Lip 118 is of a greater thickness at its tip 120 than oppositely disposed lip 122. As a result, since plastic fastener profiles 104 and 112 are constructed of resilient plastic material, when cylindrical member 110 is pressed into C-shaped member 116, lips 122 and 118 diverge sufficiently for cylindrical member 110 to pass therein. Lip 118 then engages indentation 110. As a result of lip 118, the force required to separate fastener profiles 104 and 112 is greater than that required to press them together. Inadvertent opening of pouch 12 is thereby prevented. As in the other embodiments, a space 124 is provided for accommodating one or more layers of plastic film.

As seen in FIGS. 9d and 9e of the drawings, cylindrical members 126 and 128 are substantially rectangular in cross-section. C-shaped members 130 and 132, have an interior configuration which is shaped to closely correspond to cylindrical members 126 and 128 respectively. As a result, when cylindrical members 126 and 128 are pressed respectively into C-shaped members 130 and 132, they are fixedly interlocked therein. C-shaped member 130 has lips 130a and 130b at the distal tips of the C. Lip 130b is greater in thickness than lip 130a, making it more difficult to disengage than lip 130a. As a result, inadvertent opening of pouch 12 is prevented. Again space 138 is provided between fasteners 131 and 133, and space 140 is provided between fasteners 135 and 137 for one or more layers of plastic film.

Although cylindrical members 83, 92, 108, 126 and 128 are shown as solid cylindrical members, it may be desirable in some instances for these cylindrical members to be tubular in shape. In particular in, some instances it is desirable for the fastener profile to be more easily collapsed and flexible. In those instances, the fastener strips may be extruded with a flexible tubular member attached tangentially thereon.

Turning now to FIG. 4 of the drawings, a method of manufacturing flexible reclosable containers of the present invention is shown. A double web of plastic film 142 is advanced using commonly known powered rollers 143. The double web of plastic film 142 has a first layer 144 shown in an upper or top position and a second layer 146 shown in the bottom position. A continuous strip of first fastener profiles 150 are advanced into proximity with bottom layer 146 of plastic film 142. First fastener profile 148 and second fastener profile 150 are aligned by means of guides 152. In the embodiment shown, a gap 154 in guide 152 is provided which is sized to precisely position first fastener member 148 in proximity to top layer 144 of plastic film 142. Similarly, a gap 156 is provided on the opposite side of guide member 152 for guiding second fastener member 150 into proximity with bottom layer 146 of plastic film 142. Gaps 154 and 156 are in turn angled so as to direct fastener profiles 148 and 150 into contact with first layer 144 and second layer 146 respectively of plastic film 142.

A third fastener strip 166 is positioned above top layer 144 and is guided into contact with top layer 144 by means of gap 168. Similarly, a fourth fastener strip 170 is positioned below bottom layer 146 so as to be guided by gap 172 into contact with bottom layer 146 of plastic film 142.

An ultrasonic seal member 158 having head 160 is positioned over plastic film 142 moving along conveyor line 164. In the embodiment shown, sealing head 160 is moved downwardly until first fastener profile 148, and second fastener profile 150 are compressed with plastic film 142 disposed therebetween. Similarly, third fastener profile 166, and fourth fastener profile 170 are compressed with plastic film 142 being disposed therebetween. Sealing head 160 is caused to vibrate at a frequency which causes a seal to be effected between the fastener profiles and the film. Sealing head 160 is then moved upwardly so as not to impede the movement of film 142 on conveyor 164. Alternatively, an anvil, (not shown), may be positioned beneath plastic film 142 and may be raised vertically so as to compress plastic film 142, with the fastener profiles thereon, against sealing head 158. Following such sealing, the anvil may be lowered. In addition, a second set of sealing heads, not shown in the drawings, may be used for effecting the bottom seals of fastener strips 150 and 170. As a result of the intermittent sealing of fastener strips 148, 150, 166 and 170 to film 142 each fastener strip is divided into a series of individual segments such as segments 174, 176, 178 etc. While sealing head 160 is an ultrasonic sealer, sealing may be accomplished by any number of applications of heat including resistance, hot air, hot bars, radiant, etc.

Double web of plastic film 142 then continues along conveyor 164 until it reaches cutting and sealing means 180. In a preferred embodiment cutting and sealing means 180 comprises an impulse sealer, as commonly known in the art, which consists of either a single flat wire which is heated electrically, a curled wire for producing perforations in plastic film 142, or a combination of a heated wire and a perforation knife. In some embodiments, the impulse sealer uses a heated wire to both seal and cut the edges of plastic film 142. In the embodiment shown in FIG. 4, plastic film 142 is sealed and perforated by sealing means 180 being intermittently raised and lowered into proximity with plastic film 142. Alternatively, a hot knife sideweld/cut-off (not shown) may be utilized for sealing and cutting the edges of pouch 12. Following such sealing and perforation, plastic film 142 may be rolled or may be further separated into individual bags. In the embodiment shown plastic web 142 is a double layer of film which is folded in a substantially U shaped configuration so that a gap 182 exists down the center line of top layer 144 of plastic film 142. As a result, following sealing by sealing means 180, a knife (not shown) may be utilized for slitting bottom layer 146 along the center line 182, so that plastic web 142 is divided into two separate webs of individual sealed containers, each web having individual containers such as container 12 connected by perforations such as perforations 184 and 186.

Alternate methods of manufacture not shown in the drawings encompass moving ultrasonic sealing mechanism 158 in parallel with plastic web 142, so as to provide a period of dwell time for the sealing heads to contact fastener strips 148 and 170. It should also be noted that, although not shown in the drawings, double web of plastic film 142 is preferably dispensed from a roller. Similarly, fastener strips 148, 150, 166 and 170 are also dispensed from rollers. In applications where it is desired to have a web of plastic containers with pouch openings running in an open configuration, the fastener strips are allowed to remain unconnected. As a result in applications such as breakfast cereal, a reclosable pouch is provided which can be filled with product and then closed during manufacture. If it is desired to provide containers in which the fastener strips are interlocked, a roller is applied against the front fastener strips 148 and 166 so as to compress them respectively against the rear fastener strips 150 and 170, thereby engaging the fastener strips with the film 142 being interposed therebetween.

As seen in FIG. 5 of the drawings, the invention includes a web 254 of reclosable plastic bags such as bags 188, 190 and 192 having a first side 144 and a second side 146. Each of the reclosable plastic bags is connected by a series of perforations such as perforations 256, 258 and 260 which extend transversely across web 254 and in parallel to each other. Perforations 256, 258 and 260 are angularly disposed and embossed into a plastic web 254 so as to form a straight longitudinal edge along each side of a reclosable bag such as bag 12, seen in FIG. 1.

As seen in FIG. 5a, perforations 262 and 264 on web 142 may be formed by positioning a twisted impulse heating wire across the width of sealing mechanism 180 so that when sealing mechanism 180 (shown in FIG. 4) is positioned in proximity to web 142 a series of embossments and perforations is formed transversely across the web, best seen in FIG. 5A.

As shown in FIG. 5, two ply plastic web 254, rather than having a gap 182 along the center line of surface 144, as in FIG. 4, is folded in a substantially flat C-shape configuration with the opening 182 between the two layers 144 and 146 running along edge 183 of web 254. First and second fastener profiles 148 and 150 are then brought into contact with the top 144 and bottom 146 of plastic web 142 and are sealed utilizing equipment substantially equivalent to that as shown in FIG. 4, but adapted for a single strip of bags. In FIG. 4 a web of plastic bags having two individual bags facing head to head is created, whereas in this embodiment, a single strip of individual bag 188, 190 and 192 connected on their sides and laying in parallel is created.

As seen in FIG. 6 of the drawings, a plastic reclosable flexible pouch 194 is shown in profile. Pouch 194 has a front wall 196 and a back wall 198. Pouch opening 200 is disposed between front wall 196 and back wall 198. Front wall 196 is doubled over into a double thickness of plastic film having a lip 202 proximate pouch opening 200. Similarly, back wall 198 is doubled over into a double thickness of plastic film having a lip 204. A first fastener profile 22 is affixed to lip 202. Although not shown in FIG. 6, first fastener profile 22 is affixed to lip 202 on its proximal end 40 and its distal end 42, as shown in FIG. 1. Similarly, second fastener profile 24 is affixed to lip 204 on its proximal end 44 and distal end 46. Again, first fastener profile 22 is disposed substantially in parallel to second fastener profile 24. First fastener profile 22 and second fastener profile 24 are adapted for interlocking engagement with lips 202 and 204, top layer 196 and bottom layer 198 disposed therebetween.

Turning now to FIG. 8 of the drawings, a pouch 206 is shown, having a front wall 208, a rear wall 210 and a pouch opening 212 at the upper edge 214 thereof. A first fastener profile 216 is affixed at its proximal end 218 and distal end 220 to top surface 208 pouch 206. Similarly, a second fastener profile 222 is affixed to the exterior of back wall 210 at its proximal end 224 and distal end 226. First and second fastener profiles 216 and 222 are constructed for selective interlocking, with front wall 208 and rear wall 210 being interposed therebetween. A third fastener profile 228 is affixed to the exterior of top surface 208 of pouch 206, substantially in parallel to first fastener profile 216 but separated by a substantial portion of pouch 206. Similarly, a fourth fastener profile 230 is affixed to the exterior of back wall 210, in substantial alignment with third fastener profile 228. Third and fourth fastener profiles 228 and 230 are constructed and arranged for selective interlocking, with front wall 208 and rear wall 210 being interposed therebetween. As a result, a pair of compartments 232 and 234 are created in pouch 206. Separate materials may be contained within compartments 232 and 234, which may be mixed by separating third and fourth fastener profiles 228 and 230 from their interlocked position. Similarly, first profile 216 and second profile 222 may be separated for dispensing material from pouch 206 or for allowing material into pouch 206.

Double compartment container 206, such as that shown in FIG. 8, can have a hole 209 punched near its upper edge 214 so as to provide a package having advertising material in an upper compartment and a second lower compartment for containing the product, all hung on a hook. A wide variety of dissimiliar materials can also be utilized for manufacturing such containers. For example, a polyethylene profile can be sealed to a polypropylene pouch. Such sealing of dissimiliar materials is accomplished utilizing film having a series of perforations or holes which enables the profile material to pass through the holes and seal to a similar material to the profile on the opposite side.

While the pouches shown in the figures generally are constructed of a single material, it is contemplated within the scope of the invention to use multi-layer materials for packaging. For example, commonly known barrier films such as paper, polyethylene, foil and polyethylene which are laminated together may have one or more fastener strips affixed thereon. Fastener strips for such film have a relatively large gap 34 contained therein so as to interlock with the barrier film interposed between the fastener strips. As a result, bag 12 may serve as a reclosable container for highly perishable food products, protected by a barrier film such as the aforementioned paper-poly foil-poly which has a great resistance to penetration by water vapor or gas. Alternatively, a heat resistant material such as polyamide (nylon) may be utilized with a second more rigid material being utilized for the fastener strips. As a result a boil in bag application is provided which is easily opened and reclosable. Pouch 206 can also be manufactured of such materials as low density polyethylene, high density polyethylene, linear low density polyethylene, blends of the foregoing, polypropylene, polyvinylchloride, and a large variety of other materials and combinations thereof.

Turning now to FIG. 7 of the drawings, a pouch 236 is disclosed having front wall 238, a back wall 240 and a pouch opening 242 extending diagonally on corner 244 of pouch 236. In the embodiment shown, the remainder 246 of the upper portion 248 of pouch 236 is sealed. First fastener profile 250 is affixed to the exterior of front wall 238 and extends diagonally thereon in alignment with pouch opening 242. A second fastener profile 252 is affixed to the exterior of back wall 240 and extends diagonally in alignment with pouch opening 242 and proximate thereto. First fastener profile 250 and second fastener profile 252 are constructed for selectively interlocking with front wall 238 and rear wall 240 disposed therebetween so as to form a reclosable pour spout 253 on pouch 236.

As mentioned previously, the aforesaid method of sealing reclosable fastener strips to a film web provides a number of advantages. In particular, since the entire width of the film is not compromised by a heat seal, the strength of the film is not weakened. Because the sealing requirements are not as severe, the film may run faster and a much smaller number of rejected containers are produced. In addition, while most applications involving reclosable bags require a certain minimum thickness of film in order to provide precise accurate seals of the fasteners to the film, in the present invention such precise sealing temperatures are not required. An additional feature of the present invention is that the zipper groove in the fastener profile cannot be contaminated by product during filling because it is located on the outside of the container. This permits use of reclosable containers where they have previously not been utilized before, such as powders and granular material.

As seen in FIG. 11 of the drawings, in an alternate embodiment of the invention, a multi-compartment pouch 266 may be formed from four separate layers 268, 270, 272 and 274 of plastic film. In one embodiment, layers 268 through 274 are sealed together about the periphery 276 of pouch 266 on the sides 280 and 282 and bottom 278, of pouch 266. Top 284 of pouch 266 remains open. First fastener profile 286 is affixed to first layer of plastic layer 268 proximate pouch opening 288. A second fastener profile 290 is affixed to the exterior of fourth layer plastic film 274, proximate pouch opening 288 and in parallel to first fastener profile 286. (First fastener profile 286 and second fastener profile 290 are substantially identical to first fastener profile 22 and second fastener profile 24 shown in FIG. 1). First fastener profile 286 and second fastener profile 290 are aligned with their respective ribs and grooves facing each other, and are sealed on their ends to pouch 266. As a result, fastener profiles 286 and 290 are interlockable by pressing the aforesaid rib and groove elements together with layers of plastic film layers 268 through 274 interposed therebetween. The resulting interlocking seals the top 284 of pouch 266, creating sealed compartments 292, 294 and 296 in pouch 266. (Note - compartments 292, 294 and 296 are shown as open in FIG. 11). Although not shown in the drawings, other multi-compartment pouches may be manufactured using additional layers of plastic film to create pouches having multiple individual compartments. As a result, a variety of incompatible materials may be packaged in a single pouch and mixed together by the user at the time of use.

Manufacture of pouch 266 may be accomplished using substantially the same processes as that shown in FIG. 4. Rather than a double web of plastic film, three or more webs of plastic film are advanced in parallel using commonly known powered rollers. Fastener profiles 286 and 290, and additional fastener profiles are advanced as shown in FIG. 4 on the top layer and bottom layer of the webs of film being advanced. The fastener profiles are then intermittently sealed to the plastic film, the film sealed into individual pouches, and the pouches separated if desired. Other conventional pouch manufacturing methods may also be utilized.

The foregoing description and drawings merely explain and illustrate the invention, and the invention is not so limited thereto except insofar as those who have the disclosure before them will be able to make modifications and variations therein without departing from the scope of the invention.

What is claimed is:

1. A reclosable flexible container comprising:
   a pouch having front and back walls and a pouch opening at the upper edge thereof;
   a first fastener profile disposed on the exterior of said back wall and extending longitudinally thereon proximate said pouch opening;
   a second fastener profile disposed on the exterior of said back wall, said first and second fastener profiles being constructed and arranged for selectively releasable interlocking with said front and back walls of said pouch being interposed therebetween;
   said first and second profile fastener profiles each comprising a strip of flexible plastic material having a base and an interlocking portion projecting from said base; and
   each of said fastener profiles having a proximal end and a distal end, said profiles being sealed only at said ends to the exterior of said pouch.

2. The reclosable flexible container of claim 1 wherein said interlocking portion comprises a male member projecting from said profile adapted for engagement with an oppositely disposed fastener profile.

3. The reclosable flexible container of claim 1 wherein said interlocking portion comprises a female member projecting from said profile and adapted for engagement with the oppositely disposed profile.

4. The reclosable flexible container of claim 1 wherein said interlocking portion includes both a male member and a female member projecting from said fastener profile and adapted for engagement with an oppositely disposed fastener profile.

5. The flexible reclosable container of claim 1 wherein said pouch is constructed of two or more layers of plastic material.

6. The flexible reclosable container of claim 1 wherein said pouch is constructed of a heat resistant polymer capable of being boiled in water, and said first and second fastener profiles are constructed of a second different thermoplastic material adapted for facilitating manual interlocking of said fastener profiles.

7. A bag structure comprising:
   a bag body having an open top and bag walls formed of a thin plastic film;
   facing, mating, interlocking fastener profiles formed of a resilient material and extending longitudinally and in parallel to said open top of said bag, each of said fastener profiles having a base sealed to one of the exterior surfaces of said bag walls;

at least one of said fastener profiles comprising a releasable interlocking rib element extending away from said base and detached from the exterior surface of said bag;

at least one of said fastener profiles comprising a releasable interlocking groove element extending away from said base and detached from the exterior surface of said bag; and said fastener profiles having a gap disposed between said rib and groove elements when interlocked, said gap being sized so as to allow one or more layers of film to be interposed between said rib element and said groove element when interlocked, said rib element, groove element and interposed film thereby forming a substantially hermetic seal of said bag while at the same time being openable by manually drawing said rib and groove elements apart.

8. The bag structure of claim 7 and further comprising:
flanges projecting above said facing mating interlocking profiles for gripping said bag and drawing said fastener profiles apart.

9. A bag structure constructed in accordance with claim 7 wherein said bag has a front wall and a back wall joined at the bottom edge of said bag as a single unitary sheet of film.

10. A bag structure constructed in accordance with claim 7 wherein said bag has side edges, said side edges of said bag being joined by cross-seals.

11. The bag structure of claim 7 wherein said rib is biased towards the inside of said pouch, thereby causing the force required to open said pouch from the inside to be greater than the force required to open said pouch from the outside.

12. The bag structure of claim 7 wherein said groove is biased towards the inside of said bag, thereby causing the force required to open said bag from the inside to be greater than the force required to open said bag from the outside.

* * * * *

UNITED STATES PATENT AND TRADEMARK OFFICE
CERTIFICATE OF CORRECTION

PATENT NO. : 4,787,755
DATED : November 29, 1988
INVENTOR(S) : Mark Branson

It is certified that error appears in the above-identified patent and that said Letters Patent is hereby corrected as shown below:

In column 12, line 24, please change "back" to --front--.

Signed and Sealed this

Fourteenth Day of July, 1992

Attest:

DOUGLAS B. COMER

Attesting Officer

Acting Commissioner of Patents and Trademarks